US011681517B2

(12) United States Patent
Jain et al.

(10) Patent No.: US 11,681,517 B2
(45) Date of Patent: Jun. 20, 2023

(54) ROBOTIC PROCESS AUTOMATION SYSTEM WITH DISTRIBUTED DOWNLOAD

(71) Applicant: Automation Anywhere, Inc., San Jose, CA (US)

(72) Inventors: Akshat Jain, Fremont, CA (US); Anoop Tripathi, Saratoga, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 17/392,240

(22) Filed: Aug. 2, 2021

(65) Prior Publication Data

US 2021/0365260 A1 Nov. 25, 2021

Related U.S. Application Data

(63) Continuation of application No. 16/779,199, filed on Jan. 31, 2020, now Pat. No. 11,086,614.

(51) Int. Cl.
*G06F 9/455* (2018.01)
*H04L 29/06* (2006.01)
*G06F 9/445* (2018.01)
*G06F 21/57* (2013.01)
*G06F 8/65* (2018.01)
*G06F 9/48* (2006.01)
*G06F 16/14* (2019.01)

(52) U.S. Cl.
CPC .............. *G06F 8/65* (2013.01); *G06F 9/4881* (2013.01); *G06F 16/148* (2019.01)

(58) Field of Classification Search
CPC .......... G06F 9/5027; G06F 8/656; G06F 8/65; G06F 16/148; G06F 9/4881; G06F 21/32; H04L 51/02; H04L 63/0861; H04L 63/10; G06N 3/044; G10L 17/24
See application file for complete search history.

(56) References Cited

U.S. PATENT DOCUMENTS 5,949,999 A 9/1999 Song et al.
5,983,001 A 11/1999 Boughner et al.
(Continued)

OTHER PUBLICATIONS

Torkhani et al., Intelligent Framework for Business Process Automation and Re-engineering, 6 pages (Year: 2018).*
(Continued)

*Primary Examiner* — Thuy Dao (57) ABSTRACT

A server responds to a request to perform a first automation task to process a work item from the plurality of work items, on a first computing device that is separate and independent from the server. The server receives a request from the first computing device to download the first automation task and queries a distribution information file to identify one or more other computing devices that have a copy of the first automation task. The server provides to the first computing device, an identifier for each of one or more other computing devices that has a copy of the first automation task. If the distribution information file does not contain an identification of any other device that has a copy of the first automation task, then the server processor causes the first automation task to be retrieved and to be provided to the first computing device.

20 Claims, 9 Drawing Sheets

(56) References Cited

U.S. PATENT DOCUMENTS

| | | | |
|---|---|---|---|
| 6,133,917 A | 10/2000 | Feigner et al. | |
| 6,389,592 B1 | 5/2002 | Ayres et al. | |
| 6,427,234 B1 | 7/2002 | Chambers et al. | |
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 6,957,186 B1 | 10/2005 | Guheen et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,621,584 B1 | 4/2017 | Schmidt et al. | |
| 9,946,233 B2 | 4/2018 | Brun et al. | |
| 10,733,329 B1* | 8/2020 | Ragupathy | G06F 21/78 |
| 10,958,689 B1* | 3/2021 | Ganesan | G06N 20/00 |
| 11,086,614 B1 | 8/2021 | Jain et al. | |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0172526 A1 | 9/2004 | Fann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2007/0156677 A1 | 7/2007 | Szabo | |
| 2008/0005086 A1 | 1/2008 | Moore | |
| 2008/0027769 A1 | 1/2008 | Eder | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0106671 A1 | 4/2010 | Li et al. | |
| 2010/0138015 A1 | 6/2010 | Colombo et al. | |
| 2010/0235433 A1 | 9/2010 | Ansari et al. | |
| 2011/0022578 A1 | 1/2011 | Fotev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0042281 A1 | 2/2012 | Green | |
| 2012/0124062 A1 | 5/2012 | Macbeth et al. | |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2015/0082280 A1 | 3/2015 | Betak et al. | |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |
| 2019/0155225 A1* | 5/2019 | Kothandaraman | G05B 13/041 |

OTHER PUBLICATIONS

Al Sallami, Load Balancing in Green Cloud Computation, Proceedings of the World Congress on Engineering 2013 vol II, WCE 2013, 2013, pp. 1-5 (Year: 2013).

B. P. Kasper "Remote: A Means of Remotely Controlling and Storing Data from a HAL Quadrupole Gas Analyzer Jsing an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

Notice of Allowance for U.S. Appl. No. 16/779,199, dated Apr. 14, 2021.

Roggow et al., "Autonomous Identification of Local Agents in Multi-Agent Robotic Swarms", 4 pages (Year 2016).

* cited by examiner

ROBOTIC PROCESS AUTOMATION SYSTEM WITH DISTRIBUTED DOWNLOAD

CROSS-REFERENCE TO RELATED APPLICATION

This application is a continuation of U.S. patent application Ser. No. 16/779,199, entitled "ROBOTIC PROCESS AUTOMATION SYSTEM WITH DISTRIBUTED DOWNLOAD," and filed on Jan. 31, 2020, and which is hereby incorporated herein by reference.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

The software robots in conventional RPA systems execute on devices, physical or virtual, that are separate from an RPA server and which contain software to permit creation and/or execution of the software robot. The software robots can be of significant size (e.g., several megabytes to over 100 megabytes) and the size of the software robots tends to grow over time as the types of tasks that the software robots are programmed to perform increases in complexity. The software robots are typically provided by the RPA server to a separate device. In a larger deployment, where bots are regularly being requested by devices, the software robot download can consume significant server processing power and network bandwidth. In a RPA system available from Automation Anywhere, Inc. under the trade name Enterprise A2019, a larger number of virtual devices can be deployed to increase scalability of the RPA system. This further increases the above noted load on the RPA server and the network when providing software robot(s) to requesting devices.

SUMMARY

Computerized RPA methods and systems that improve downloads of bots and recorders are disclosed herein. In one aspect a robotic process automation system includes data storage upon which are stored a plurality of sets of task processing instructions where each set of task processing instructions is operable to interact at a user level with one or more designated user level application programs. The data storage also contains a plurality of work items, where each work item is stored for subsequent processing by executing a corresponding set of task processing instructions. A server processor is operatively coupled to the data storage and is configured to execute instructions that when executed cause the server processor to respond to a request to perform a first automation task to process a work item from the plurality of work items, on a first computing device that is separate and independent from the server processor. The server processor receives a request from the first computing device to download the first automation task and queries a distribution information file to identify one or more other computing devices that have a copy of the first automation task. The server process provides to the first computing device, an identifier for each of one or more other computing devices that has a copy of the first automation task. If the distribution information file does not contain an identification of any other device that has a copy of the first automation task, then the server processor causes the first automation task to be retrieved from the data storage and to be provided to the first computing device.

The foregoing reduces the load on the server processor by obtaining the automation task from another node within the system, which improves overall system performance. As the automation tasks become stored on multiple nodes the overall availability of the automation tasks is increasingly distributed and hence more available within the RPA system. Even if there is a corrupt segment of the automation task package, only that part is re-downloaded rather than having to download the complete package.

Moreover, even if the server processor is temporarily unavailable due to network down time or the hosting service down time, once the automation task package is available on at least one node, it can be streamed to other nodes using this approach. This reduces dependency on server processor to a large extent.

In other embodiments, distribution of an RPA runtime required by devices may also be provided in a distributed fashion to reduce load on the RPA server. Certain embodiments support multi-tenant environments with each environment operating independently of each other and receiving bots, recorders and RPA runtimes from only devices that are in the same environment.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
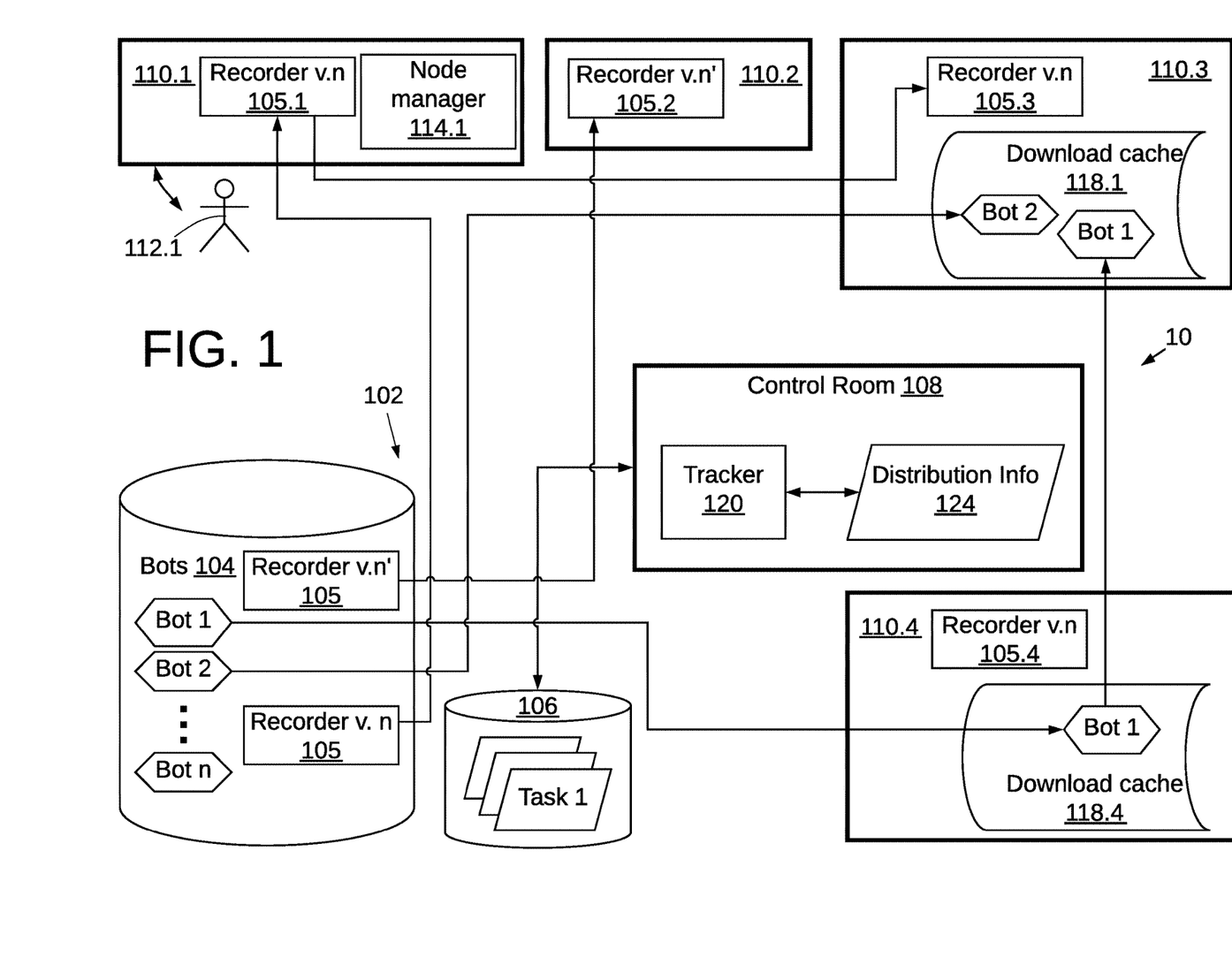
FIG. 1 is a high-level block diagram of an embodiment of an RPA system with distributed bot and recorder downloads.

In FIG. 1, the embodiments disclosed herein implement a robotic process automation system 10 that includes data storage, seen generally at 102 which stores a plurality of sets of task processing instructions 104, one or more versions of a bot recorder 105, and tasks 106. Each set of task processing instructions 104 implements a software robot, also referred to as a bot (seen as Bot 1, Bot 2, . . . , Bot n) which is operable to interact at a user level with one or more designated user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as a bot player), on which a bot will execute or is executing. The data storage 102 also stores a plurality of work items 106, where each work item 106 is stored for subsequent processing by executing a corresponding set of task processing instructions 104. A work item 106 may be for example, an invoice that requires processing by a bot 104. A control room 108, is operatively coupled to the data storage 102 and is configured to execute instructions that when executed cause the RPA system 10 to respond to a request from a client device 110, that may be issued by a user 112.1, to act as a server to provide to the client device 110 the capability to perform an automation task to process a work item from the plurality of work items 106. The client devices 110 shown in FIG. 1 are shown generally and may take the form of a physical computing device or a virtual computing device. In either form, each client device 110 is separate and independent from the control room 108 in that each client device 110 executes under an operating system that is separate and independent from an operating system on which control room 108 executes. As noted above, each computing device 110 may be physical or virtual. An embodiment of a physical computing device 110 may be a conventional physical computing device such as a desktop or laptop or server. An embodiment of a virtual computing device 110 may be a conventional operating system executing within a conventional virtual machine.

Some or all of the bots 104 may in certain embodiments be located remotely from the control room 108. Moreover, the devices 110 and 111 may also be located remotely from the control room 108. The bots 104 and the tasks 106 are shown in separate containers for purposes of illustration but they may be stored in separate or the same device(s), or across multiple devices. The control room 108 performs user management functions, source control of the bots 104, along with providing a dashboard that provides analytics and results of the bots 104, performs license management of software required by the bots 104 and manages overall execution and management of scripts, clients, roles, credentials, and security etc. The major functions performed by the control room 108 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 108 is shown generally for simplicity of explanation. Multiple instances of the control room 108 may be employed where large numbers of bots are deployed to provide for scalability of the RPA system 10.

The control room 108 provides to the client device 110, software code to implement a node manager 114 that executes on the client device 110 and which provides to a user 112 a visual interface via a browser (not shown) to view progress of and to control execution of the automation task. It should be noted here that the node manager 114 in one embodiment is provided to the client device 110 on demand, when required by the client device 110 to execute a desired automation task. In another embodiment, the node manager 114 may remain on the client device 110 after completion of the requested automation task to avoid the need to download it again. In another embodiment, the node manager 114 may be deleted from the client device 110 after completion of the requested automation task. The node manager 114 also maintains a connection to the control room 108 to inform the control room 108 that device 110 is available for service by the control room 108, irrespective of whether a live user session exists. For simplicity of illustration, the node manager 114 is shown only on device 110.1 but should be understood to be on each device 110.

The control room 108 initiates on the client device 110, a user session to perform the automation task. The control room 108 retrieves the set of task processing instructions 104 that correspond to the work item 106. The task processing instructions 104 that correspond to the work item 106 execute under control of the user session, on the device 110. The node manager 114 provides update data indicative of status of processing of the work item to the control room 108. The control room 108 terminates the user session upon completion of processing of the work item 106.

The hots 104 execute on a player (not shown), via a computing device, to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference in its entirety. The bot player executes, or plays back, the sequence of instructions encoded in a bot. The sequence of instructions is captured by way of a recorder 105 when a human performs those actions, or alternatively the instructions are explicitly coded into the bot. These instructions enable the bot player, to perform the same actions as a human would do in their absence. The instructions are composed of a command (action) followed by set of parameters, for example: Open Browser is a command, and a URL would be the parameter for it to launch the site.

The user 112 interacts with node manager 114, typically via a conventional browser which employs the node manager 114 to communicate with the control room 108. When for the first time 112 user logs from client device 110 onto the control room 108, they are prompted to download and install the node manager 114 on the device 110, if one is not already present. The node manager 114 establishes a web socket connection to a user session manager (not shown), deployed by the control room 108 that lets the user 112 subsequently create, edit and deploy the bots 104.

The node manager 114 which is provided to the device 110 by the control room 108, in certain embodiments provides a number of functions. First is a discovery service that establishes and maintains a connection to the control room 108 and acts as a resource to the control room 108 for the device 110. Second, the node manager 114 provides an autologin service that provides a vehicle to allow the control room 108 to login or to create a user session by launching a user session manager which works with the control room 108 to serve control room requests. Third, the node manager 212 provides a logging function to provide a single, centralized point for streaming of all logging data back to the control room 108, via the health service, which stores the received log data to a data log.

As seen in FIG. 1, devices 110.1, 110.3 and 110.4 each have deployed thereon a recorder 105 with a first version, v.n. Device 110.2 has deployed thereon a recorder 105.2 with a second version, v.n'. Each of the devices 110 maintains thereon a download cache 118, which is seen for simplicity of illustration in detail only in connection with device 110.3. The download cache 118 is operated by the node manager 114 to store a copy of the recorder 105 and any bots 104.

The bots 104 and recorder 105 may be periodically updated from time to time and any device containing a bot 104 or a recorder 105 will need to be updated with a new version when a new version is generated and when the bot or recorder is executed on the device. The RPA system 10 may interact with a large number of devices 110 at any given time, and such devices will download new versions of a bot 104 or recorder 105 when such bots or recorders are required to be executed. These downloads consume bandwidth and processor resources of the control room 108 which can impact performance of the control room 108. The bots 104 can be substantial in size, typically ranging from 2 Mbytes to about 100 Mbytes, and maximum and average size of the bots 104 can be expected to grow as the tasks performed by such bots grows in complexity. The recorder 105 similarly can consume approximately 100 Mbytes as its capability continues to grow.

The RPA system 10 shown in FIG. 1 provides for distributed downloads of bots 104 and recorder 105 to improve download speed and to reduce load on the control room 108, which further improves overall performance of the RPA system 10. In FIG. 1, when device 110.2 needs version n of recorder 105 it can obtain it from node 110.1 which has version n of recorder 105. Device 110.3 obtains bot 2 directly from the control room 108 via storage 104. Bot 1 is provided to device 110.3 from download cache 118 of device 110.4.

Figure 2:
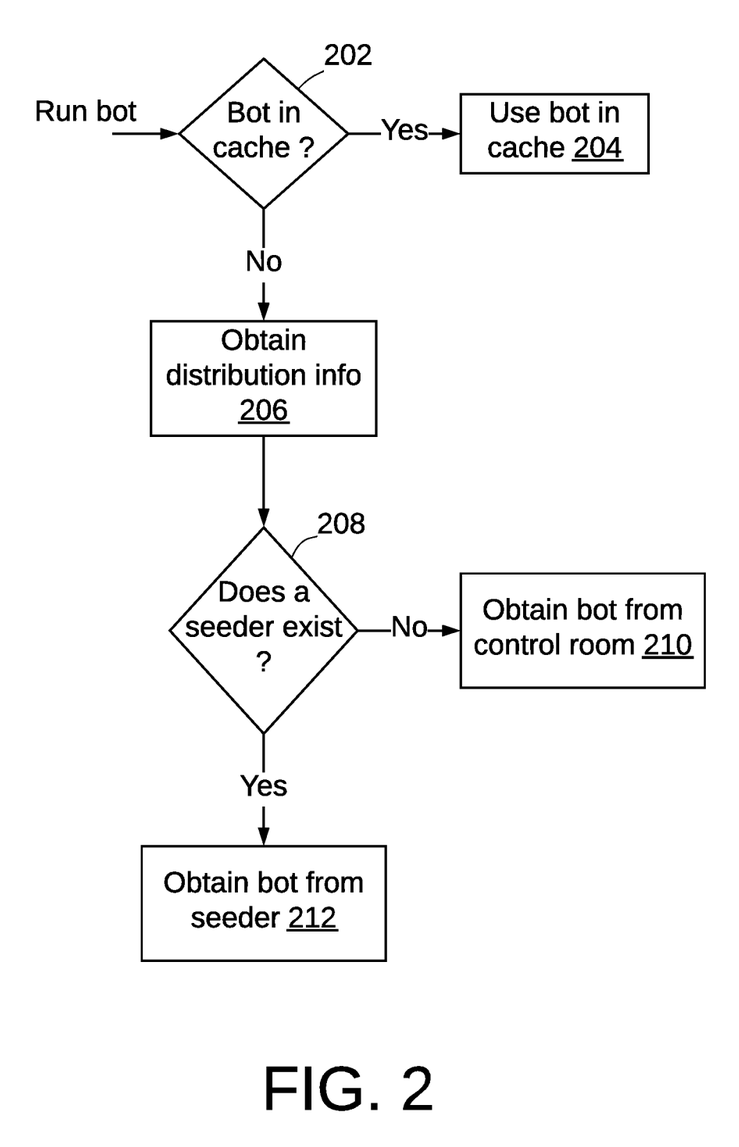
FIG. 2 is flow diagram illustrating operations by a node in the RPA system of FIG. 1 in obtaining a software robot.
Figure 3:
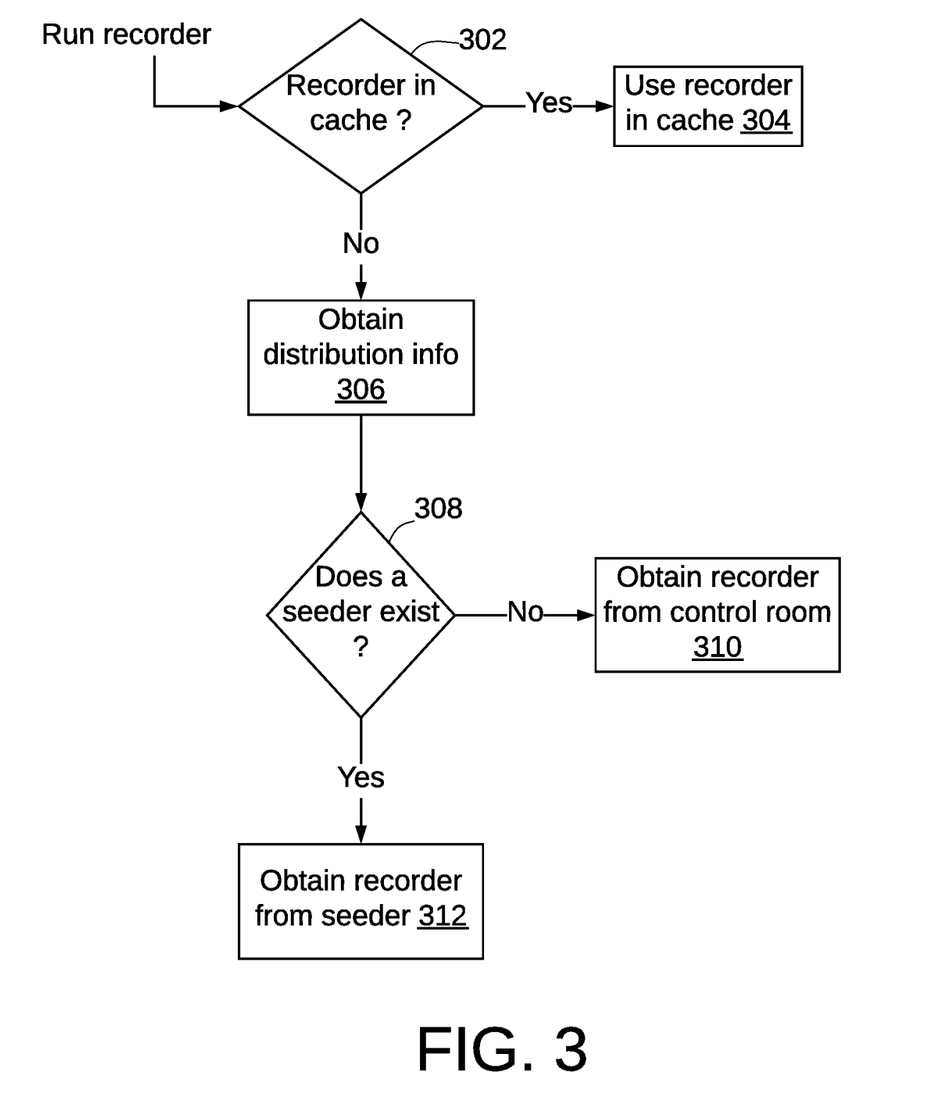
FIG. 3 is flow diagram illustrating operations by a node in the RPA system of FIG. 1 in obtaining a recorder.

Control room 108 implements a tracker service 120 to manage the download of bots 104 and recorder 105. Operation of node manager 114 in connection with tracker service 120 may be seen in FIGS. 2 and 3. Turning to FIG. 2, when a device 110 receives a command to execute a bot 104 (for this example, lets use Bot 1), the node manager 114 on the device in question checks at 202 its download cache 118. If Bot 1 is in the cache 118, the node manager 114 at 204 uses the bot in the cache. If Bot 1 is not in the cache 118, the node manager 114 at 206 contacts the tracker service 120 which identifies to the node manager 114 whether Bot 1 is available on another device, referred to herein as a seeder node. If Bot 1 is not available on any other device the node manager 114 obtains at 210 Bot 1 from the control room 108 via the storage 104. If a seeder node exists, the node manager 114 obtains Bot 1 at 212 from the seeder node. Now when any other node wants to run Bot 1, it will check its download cache 118 for the version it has. If the node does not have the latest version of Bot 1, then this node will query for the distribution information via the tracker service 120. In one embodiment, this query is performed via a UDP protocol. FIG. 3 illustrates operation of the node manager 114 in connection with the tracker service 120 with respect to download of bot recorder 105. The operations in FIG. 3 are analogous to the above described operations for FIG. 2.

Once a first seeder node has been established, the recorder 105 or bots 114 stored in the download cache of the first seeder node may be obtained from the seeder first node. A subsequent node that obtains a recorder 105 or a bot 114 from the seeder node becomes another seeder node with respect to the recorder 105 or bot 114 contained in its download cache. The second, third, etc. seeder node(s) become another source (in addition to the first seeder node) of the recorder 105 and bot(s) 114 in their download cache 118.

Figure 4:
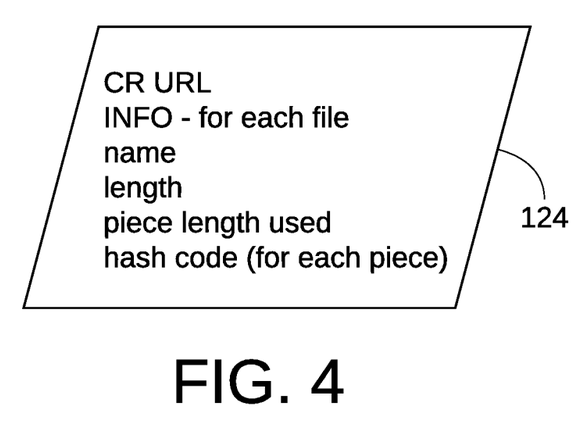
FIG. 4 illustrates an arrangement of data in a distribution information file in the RPA system of FIG. 1.

In one embodiment, download of the recorder 105 and bots 104 may be performed in accordance with the BitTorrent file sharing protocol, as described for example in *The BitTorrent Protocol Specification* by B. Cohen, January 2008 available at bittorrent.org. As a user 112 employs recorder 105 to create a new bot 104, the control room 108 stores the bot 104 and creates for the bot 104 a distribution info file 124, details of which are shown in FIG. 4. The distribution info file 124 in one embodiment contains information as described by Cohen, supra. A network identifier, such as a Uniform Resource Locator (URL) of the control room 108 is contained in the distribution info file 124 along with a reference to an information dictionary as described by Cohen:

piece length: maps to the number of bytes in each piece the file is split into. For the purposes of transfer, files are split into fixed-size pieces which are all the same length except for possibly the last one which may be truncated. Piece length is almost always a power of two.

Pieces: maps to a string whose length is a multiple of 20. It is to be subdivided into strings of length 20, each of which is the SHA1 hash of the piece at the corresponding index.

There is also a key length or a key files, but not both or neither. If length is present then the download represents a single file, otherwise it represents a set of files which go in a directory structure.

In the single file case, length maps to the length of the file in bytes.

For the purposes of the other keys, the multi-file case is treated as only having a single file by concatenating the files in the order they appear in the files list. The files list is the value files maps to, and is a list of dictionaries containing the following keys: length—The length of the file, in bytes; path—A list of UTF-8 encoded strings corresponding to subdirectory names, the last of which is the actual file name (a zero length list is an error case).

In the single file case, the name key is the name of a file, in the multiple file case, it's the name of a directory.

The tracker 120 may also in one embodiment operate as described by Cohen, supra. As will be appreciated by those skilled in the art in view of the present disclosure, the BitTorrent protocol allows a node seeking to download a file to join a "swarm" of hosts to upload to/download from concurrently from each of the other nodes that may have the file or a portion of the file. The BitTorrent protocol provides an alternative to conventional single source, multiple mirror sources techniques for distributing data, and can work effectively over networks with lower bandwidth. The file being distributed is divided into segments called pieces. As each peer receives a new piece of the file, it becomes a source (of that piece) for other peers, relieving the original seeder node from having to send that piece to every computer or user wishing to receive a copy. Each piece is protected by a cryptographic hash contained in the distribution info file as described above. This ensures that any modification of the piece can be reliably detected, and thus prevents both accidental and malicious modifications of any of the pieces received at other nodes. If a node starts with an authentic copy of the torrent descriptor, it can verify the authenticity of the entire file it receives. The torrent descriptor contains a cryptographic has that protects each piece of the file as it is distributed. In a typical BitTorrent download, pieces of a file are downloaded non-sequentially, and are rearranged into the correct order by the receiving BitTorrent client, which monitors which pieces it needs, and which pieces it has and can upload to other peers. Pieces are of the same size throughout a single download (for example a 10 MB file may be transmitted as ten 1 MB pieces or as forty 256 KB pieces). This approach permits the download of any file to be halted at any time and to be resumed at a later time, without the loss of previously downloaded information. This makes BitTorrent particularly useful in the transfer of larger files. In certain embodiments, the receiving node may seek out readily available pieces and download them immediately, rather than halting the download and waiting for the next (and possibly unavailable) piece in line, which typically reduces the overall time of the download.

Each of the devices 110 with which the RPA system 10 operates is registered with the control room 108 as a seeder node for a particular bot 104 and/or recorder 105, which makes each of the devices 110 a trusted node, thereby avoiding the security issues often faced in BitTorrent implementations, as described by Cohen, supra. In addition to the foregoing information maintained by the control room 108, the control room 108 also maintains for each device 110, a device ID, an IP address for the device and the file name(s) of the files for which the device is a seeder node along with a file hash for each file, and a size of each stored file. In contrast to standard BitTorrent implementations, in the embodiments described herein, the network identifier specified in the distribution info file 124 is fixed to identify only the control room 108. This restricts the nodes from downloading bots, recorders and other RPA required executables from only the control room 108 and devices authorized by the control room 108.

In one embodiment, if a seeder node has an older version of a bot 104, that bot remains on the seeder node as long as it is executed. In such an embodiment, when it is executing a bot, the node manager 114 will check for the latest version of the bot in question on the control room 108. If the version differs, the node manager 114 will obtain a list of seeder nodes for the updated version of the bot 104 in question from the tracker service 120 and download the updated bot 104 in the manner shown in FIG. 2. A similar process is followed for execution of recorder 105.

Figure 5:
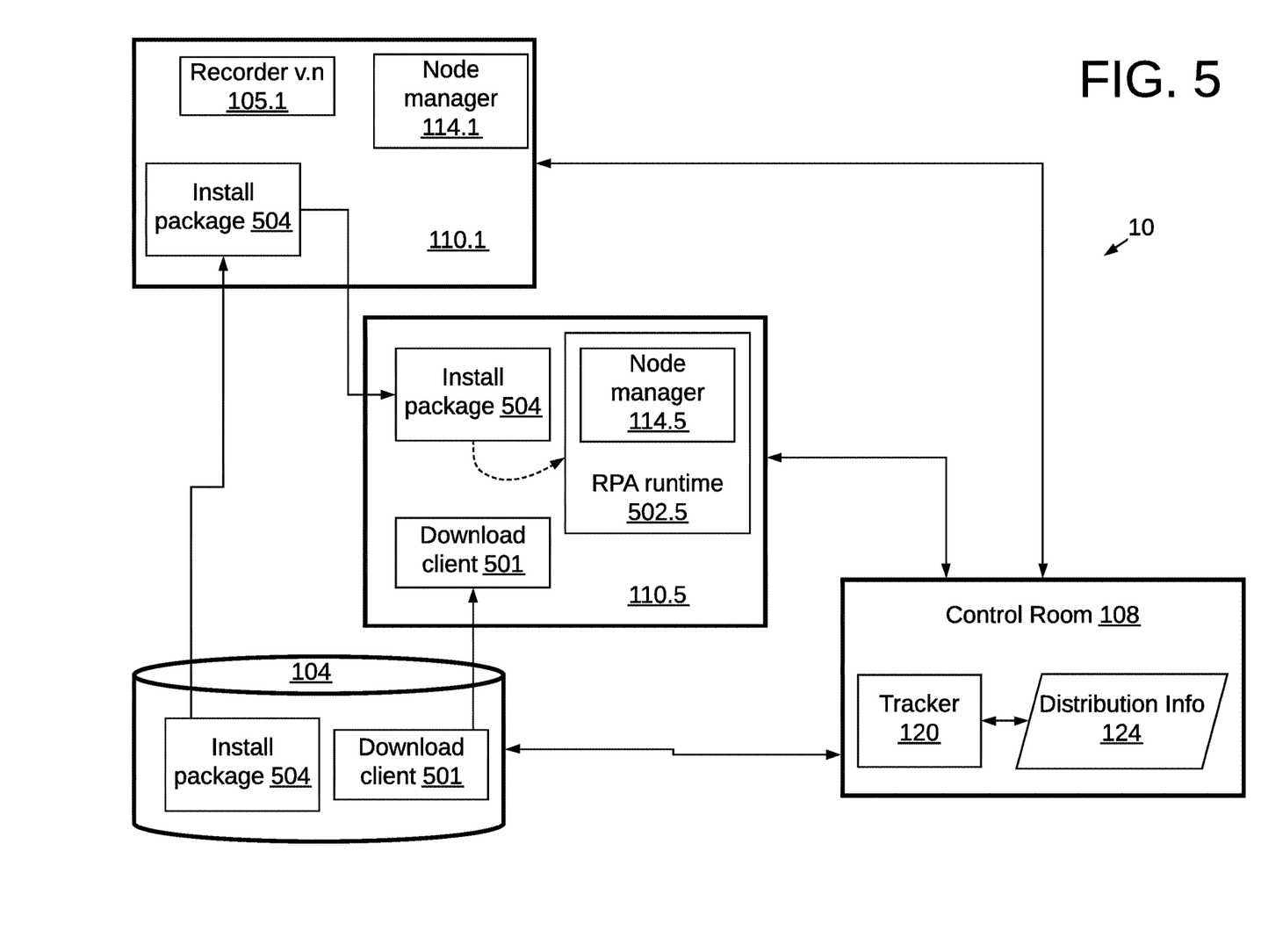
FIG. 5 illustrates an embodiment of distribution in an RPA system of a software package from which an execution environment to execute a bot may be generated.

FIG. 5 illustrates an embodiment of distribution in an RPA system of a software package from which an execution environment to execute a bot may be generated. The node manager 114 comprises part of an RPA runtime 502 which includes elements such as a virtual machine to permit execution of bots on a variety of operating systems, a bot player, and a logger among other elements. In FIG. 5, the RPA runtime 502.5 has been obtained from an install package 504 which is executed on device 110.5 to generate the RPA runtime 502.5. The install package 504 may advantageously be obtained from a seeder node for the install package. As shown in FIG. 5 the install package 504 is resident on device 110.1 which acts as a seeder node to supply the install package to device 110.5. In the embodiment of FIG. 5, the tracker 120 manages and tracks deployment of the install package 504 among the devices in the system 10 in the manner described above in connection with FIG. 1. In one embodiment, the install package may be distributed by way of download client 501 which includes functionality of a BitTorrent client. Once installed on a device 110 the download client 501 initiates a download of the install package via control room 108 or from a seeder node if one exists. The download client 501 is typically of a modest size and may be directly provided by the control room 108. The install package 504 can be over 100 Mbytes and the system 10 accordingly benefits from the distributed download of the install package 504. This is particularly beneficial when the RPA runtime 502 is updated, which in some environments can be frequent. The RPA runtime 502 can be provided by the control room 108 to a single device, which can act as the seeder node for other devices.

Figure 6:
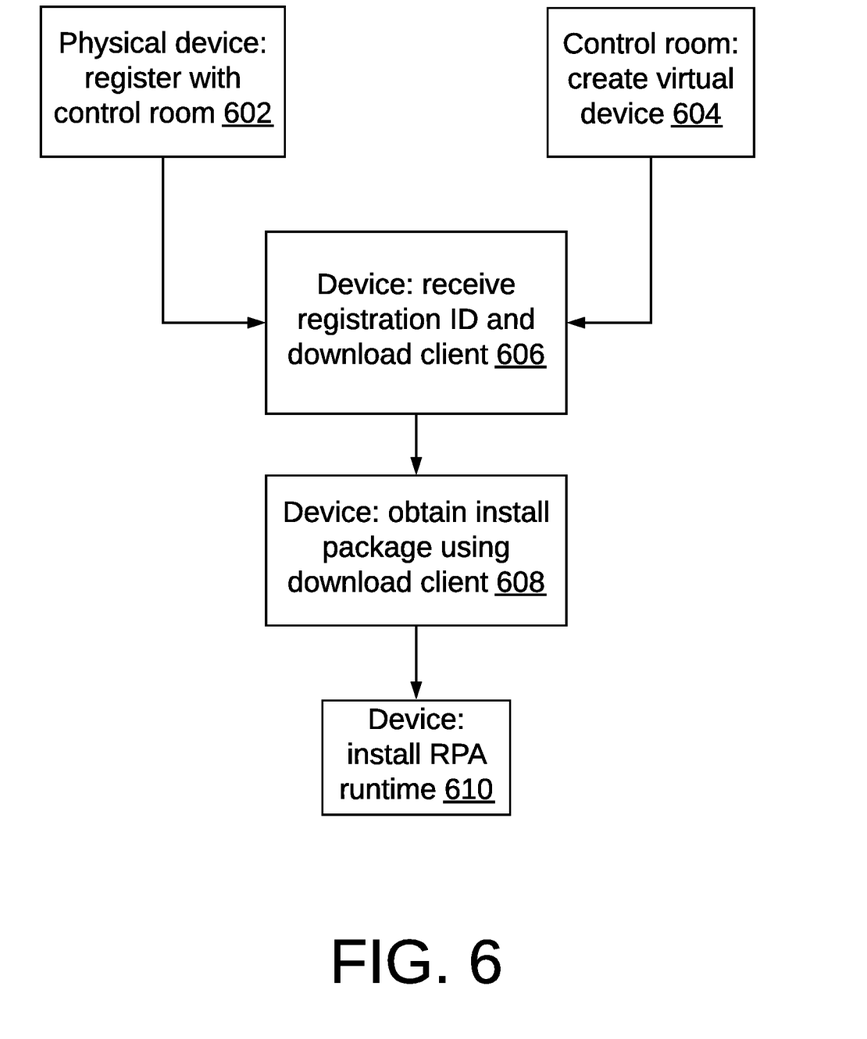
FIG. 6 is a flow diagram illustrating an operation in the embodiment of FIG. 5.

FIG. 6 is a flow diagram illustrating operation of the embodiment of FIG. 5. As described in connection with FIG. 1, devices 110 may be physical or virtual. For a physical device, (or for a virtual device that is initiated separately from the control room 108) when it is desired to add the device 110 as a resource to the RPA system 10, a registration request is sent at 602 to the control room 108. For a virtual device created under control of the control room 108, upon creation, the device 110 receives at 606, as like the physical device, a registration ID that uniquely identifies the device 110 to the control room 108. The control room 108 also provides to the device 110 a download client 601, as described above in connection with FIG. 6. The device 110 then proceeds at 608 to obtain install package 604 and to install at 610 the RPA runtime 602.

Figure 7A:
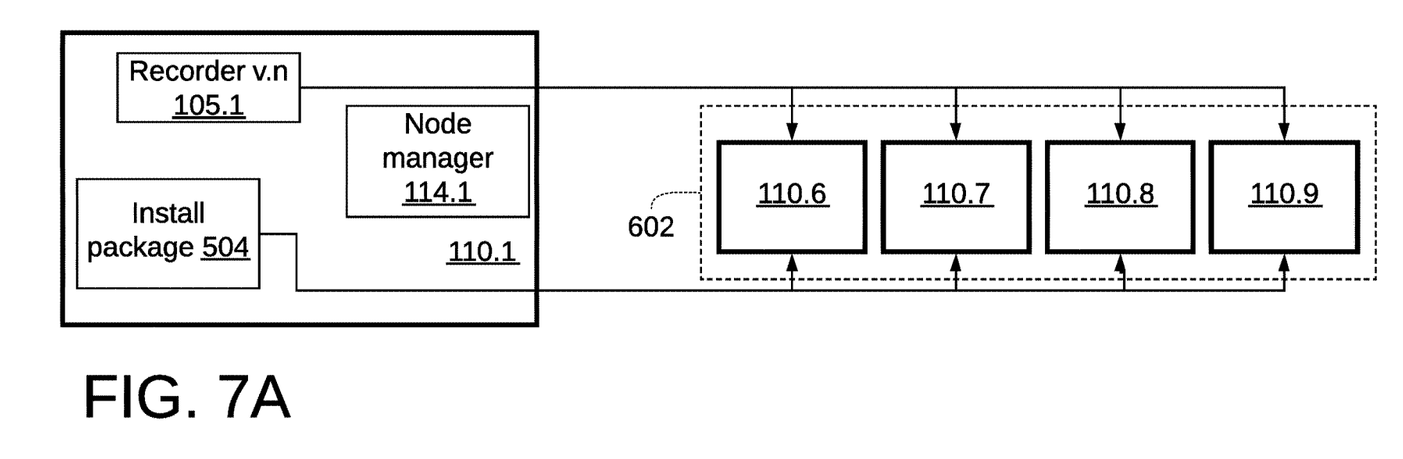
FIGS. 7A and 7B are block diagrams of two embodiments of updating of device pools in an RPA system.
Figure 7B:
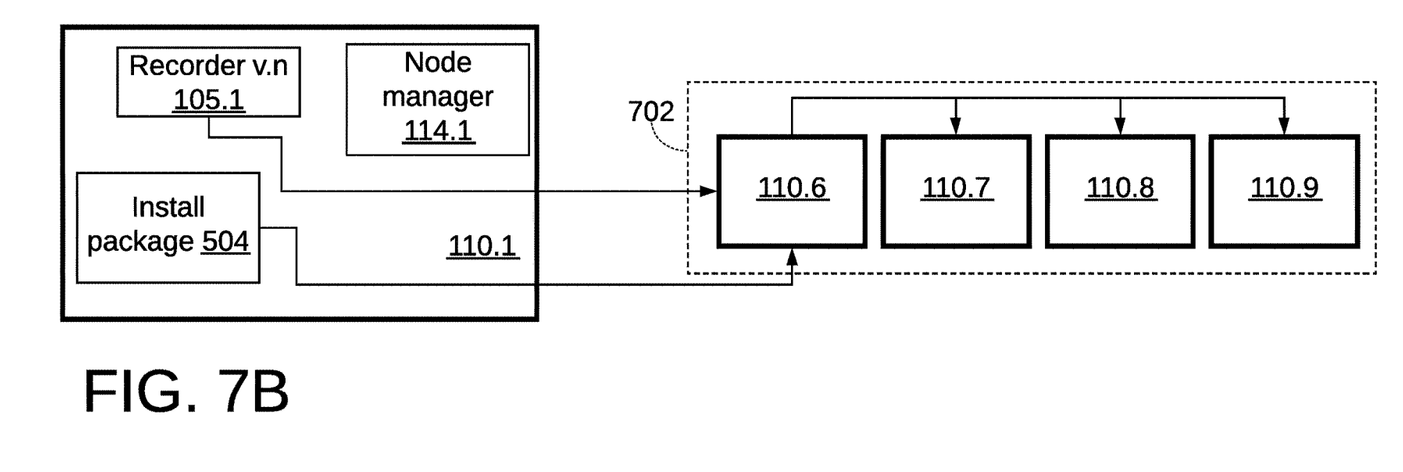

FIGS. 7A and 7B are block diagrams of two embodiments of updating of device pools in an RPA system. The RPA system 10 supports device pools which are a logical grouping of similar type of devices on which bots are run as work items from their respective queues. For example, a group of devices in a particular department/unit can be grouped together into a device pool recognized by the control room 108. In FIGS. 7A and 7B, devices 110.6, 110.7, 110.8 and 110.9 are treated by control room 108 as a device pool 702. The device pool 702 may be used for example to process work items such as invoices to process invoices received over the prior n days. The devices in the device pool may then be used to perform a different work task. The devices in the device pool 702 may be updated in accordance with the embodiments shown in FIGS. 7A and 7B. In FIG. 7A, each device 110 in the device pool 702 is updated directly from one seeder node. In FIG. 7A, each device 110 is shown being updated from device 110.1. In FIG. 7B, a single device 110 in the device pool 702 acts as a seeder node for the remaining devices in the device pool 702. As seen, device 110.6 acts as a seeder node for the other devices 110.7, 110.8 and 110.9.

Figure 8:
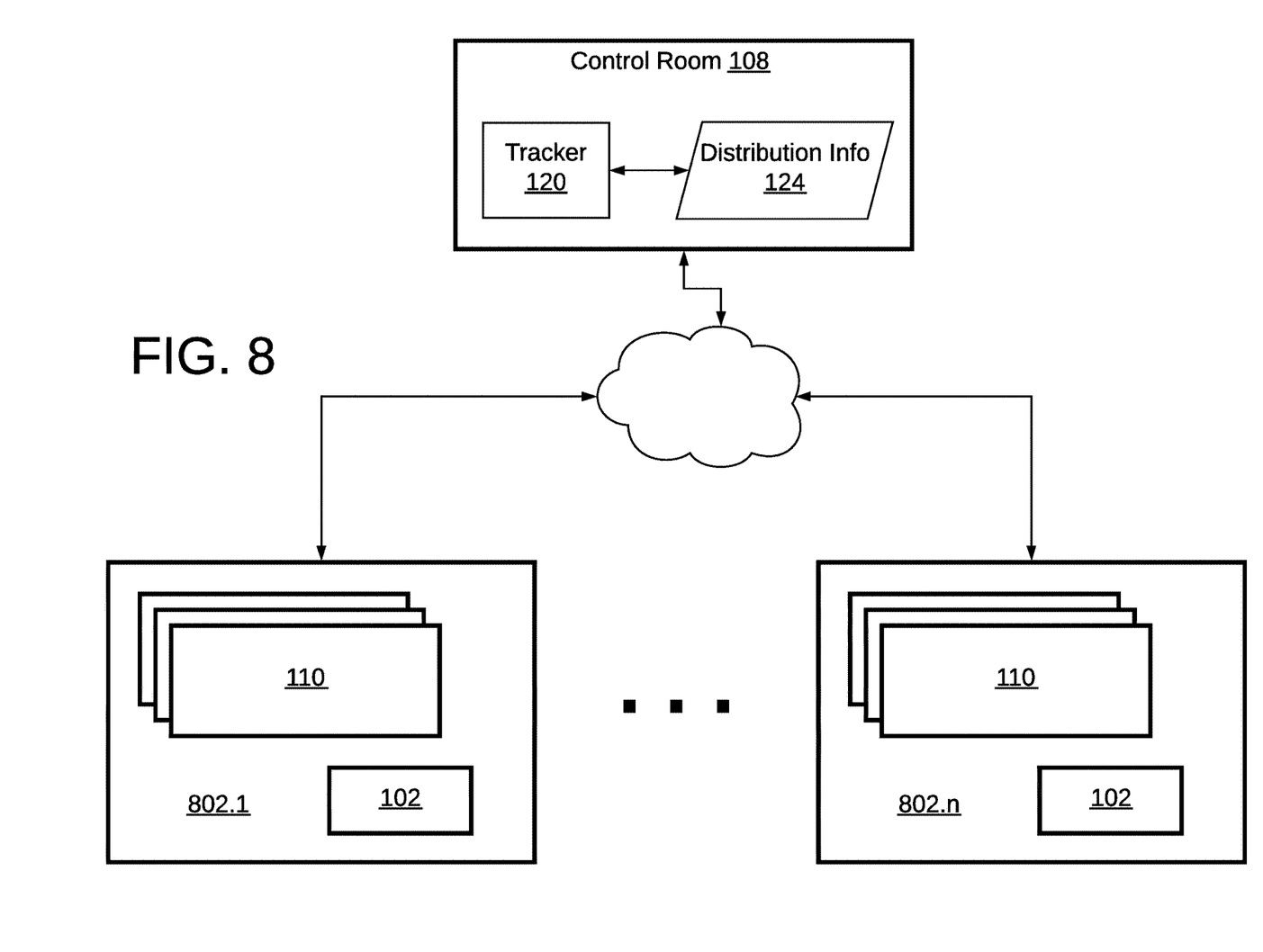
FIG. 8 is a block diagram of a multi-tenant embodiment.

In another embodiment, the control room 108 may be configured to support an RPA system 10 in multiple organizations. Such an arrangement is referred to herein as a multi-tenant environment. In such an environment, the control room 108 may support an RPA system at for example Company A and an RPA system at for example Company B and another RPA system at for example Company C. This is shown in FIG. 8 multiple systems 802 (802.1, . . . , 802.*n*) are shown interacting with a single control room 108. In FIG. 8, each system 802 includes devices 110 and storage 102 as described in connection with FIG. 1 and control room 108 operates with each system 802 as described in connection with FIG. 1. The control room 108 may be located remotely from each system 802 and may communicate for example with each system 802 over the Internet. The control room 108 in the multi-tenant embodiment of FIG. 8 employs a tenant ID to uniquely identify each tenant. The tracker 120 in the embodiment of FIG. 8 adds a tenant ID to the distribution info file 124 to uniquely identify each device 110. In the embodiment of FIG. 8, the storage 102 is separate for each system 802. In another embodiment, the storage 102 may be shared among one or more systems 802.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 9:
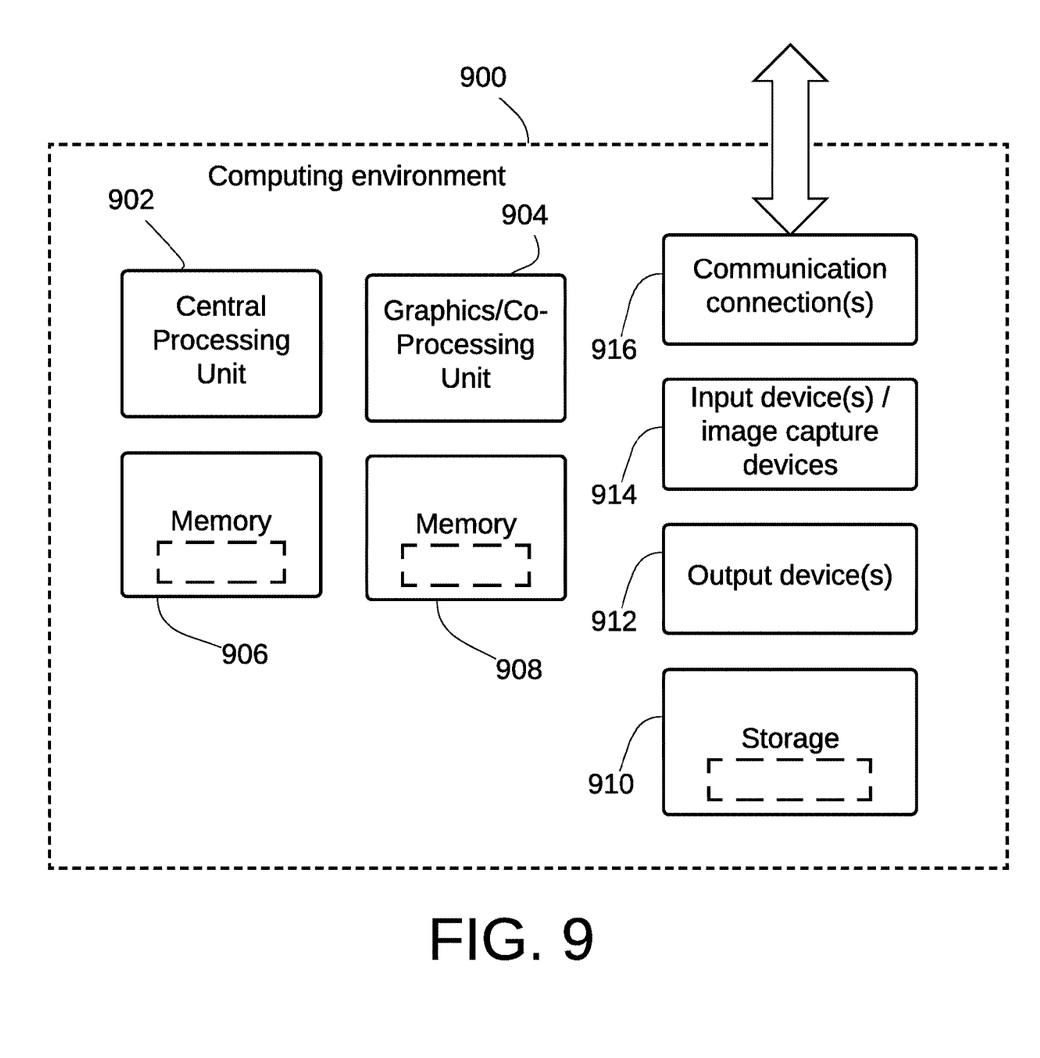
FIG. 9 illustrates a block diagram of hardware that may be employed in an implementation of the RPA systems disclosed herein.

FIG. 9 illustrates a block diagram of hardware that may be employed in an implementation of the RPA system as disclosed herein. FIG. 9 depicts a generalized example of a suitable general-purpose computing system 900 in which the described innovations may be implemented in order to improve the processing speed and efficiency with which the computing system 900 operates to perform the functions disclosed herein. With reference to FIG. 9 the computing system 900 includes one or more processing units 902, 904 and memory 906, 908. The processing units 902, 906 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 9 operates. The various components of computing system 900 may be rearranged in various embodiments, and some embodiments may not require nor include all of the above components, while other embodiments may include additional components, such as specialized processors and additional memory.

Computing system 900 may have additional features such as for example, storage 910, one or more input devices 914, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, or any other medium which can be used to store information in a non-transitory way, and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 900. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a certain embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for accessing a bot over at least one network, the bot being associated with a Robotic Process Automation (RPA) system that supports a plurality of bots, the RPA system including a RPA server that couples to a plurality of nodes over the at least one network, each of the bots comprising a set of task processing instructions, each of the bots being operable to interact at a user level with one or more user level application programs, the method comprising:
   receiving, at the RPA server, a request from a first computing device to download a particular bot of the plurality of bots, the first computing device being separate and independent from the RPA server;
   determining one or more of the nodes that have a digital copy of the particular bot, each of the determined one or more of the nodes being separate and independent from the RPA server and the first computing device;
   alerting the first computing device to download the particular bot from the determined one or more of the nodes, if the determining has determined that the particular bot is available from the determined one or more of the nodes; and
   downloading the particular bot from the RPA server, if the determining has determined that the particular bot is not available from any of the one or more of the nodes.

2. A computer-implemented method as recited in claim 1, wherein the one or more of the nodes correspond to computing devices associated with clients of the RPA system.

3. A computer-implemented method as recited in claim 1, wherein each of the one or more nodes is a computing device.

4. A computer-implemented method as recited in claim 1, wherein the method comprises:
   receiving a selection of identifier for a selected node of the determined one or more of the nodes;
   requesting download of the particular bot from the selected node to the first computing device; and
   receiving the particular bot from the determined node.

5. A computer-implemented method as recited in claim 4, wherein the method comprises:
   transmitting an update to the RPA server that the particular bot has been downloaded to the first computing device.

6. A computer-implemented method as recited in claim 4, wherein the method comprises:
   prior to requesting download of the particular bot from either the RPA server or the selected node, checking for presence of the particular bot in a cache maintained by the first computing device.

7. A computer-implemented method for accessing a bot recorder over at least one network, the bot recorder being associated with a Robotic Process Automation (RPA) system that supports a plurality of bot recorders, the RPA system including a RPA server that couples to a plurality of nodes over the at least one network, each bot recorder operable to capture user interactions with one or more designated user level application programs, the method comprising:
   receiving, at the RPA server, a request from a first computing device to download a bot recorder, the first computing device being separate and independent from the RPA server;
   determining one or more of the nodes that have a digital copy of the bot recorder, each of the determined one or more of the nodes being separate and independent from the RPA server and the first computing device;
   alerting the first computing device to download the bot recorder from the determined one or more of the nodes, if the determining has determined that the bot recorder is available from the determined one or more of the nodes; and
   downloading the bot recorder from the RPA server, if the determining has determined that the bot recorder is not available from any of the one or more of the nodes.

8. A computer-implemented method as recited in claim 7, wherein the one or more of the nodes corresponding to computing devices associated with clients of the RPA system.

9. A computer-implemented method for accessing a RPA install package over at least one network, the RPA install package being associated with a Robotic Process Automation (RPA) system that supports a plurality of software robots, the RPA system including a RPA server that couples to a plurality of nodes over the at least one network, each RPA install package operable support installation of a RPA run time environment, the method comprising:
   receiving, at the RPA server, a request from a first computing device to download a RPA install package, the first computing device being separate and independent from the RPA server;
   determining one or more of the nodes that has a digital copy of the RPA install package, each of the determined one or more of the nodes being separate and independent from the RPA server and the first computing device;
   alerting the first computing device to download the RPA install package from the determined one or more of the nodes, if the determining has determined that the RPA install package is available from the determined one or more of the nodes; and
   downloading the RPA install package from the RPA server to the first computing device, if the determining has determined that the RPA install package is not available from any of the one or more of the nodes.

10. A computer-implemented method as recited in claim 9, wherein the method comprises:
    subsequently executing the RPA install package to install a run time environment on the first computing device, the run time environment suitable for executing automation tasks for a software robot supported by the RPA system.

11. A computer-implemented method as recited in claim 10, wherein the method comprises:

identifying a software robot to be performed; and performing the software robot using the run time environment on the first computing device.

12. A computer-implemented method as recited in claim 10, wherein the method comprises:

interacting with the run time environment on the first computing device after the RPA package has been installed.

13. A computer-implemented method as recited in claim 9, wherein the method comprises:

receiving, at the first computing device, a RPA package request from a second computing device; and responding to the RPA package request from the second computing device to provide the previously received RPA package from the first computing device to the second computing device.

14. A computer-implemented method as recited in claim 9, wherein the method comprises:

receiving, at the RPA server, a RPA package request from a second computing device; and responding to the RPA package request from the second computing device to provide an identifier for the previously received RPA package at the second computing device.

15. A computer-implemented method as recited in claim 9, wherein the method comprises:

receiving, at the RPA server, a RPA package request from a second computing device; and responding to the RPA package request from the second computing device to direct the second computing device to download the RPA package previously received at the first computing device to the second computing device.

16. A tangible storage medium, having stored thereupon computer-executable instructions for execution on a computer system, the computer-executable instructions causing the computer system to access a bot-related file over at least one network, the bot-related file being associated with a Robotic Process Automation (RPA) system that supports a plurality of bots, the RPA system including a RPA server that couples to a plurality of nodes over the at least one network, each of the bots being operable to interact at a user level with one or more application programs, the tangible storage medium comprising:

computer-executable instructions for receiving, at the RPA server, a request from a first computing device to download a particular bot-related file, the first computing device being separate and independent from the RPA server;

computer-executable instructions for determining one or more of the nodes that have a digital copy of the particular bot-related file, each of the determined one or more of the nodes being separate and independent from the RPA server and the first computing device;

computer-executable instructions for alerting the first computing device to download the particular bot-related file from the determined one or more of the nodes, if the computer-executable instructions for determining has determined that the particular bot-related file is available from the determined one or more of the nodes; and computer-executable instructions for downloading the particular bot-related file from the RPA server, if the computer-executable instructions for determining have determined that the particular bot-related file is not available from any of the one or more of the nodes.

17. A tangible storage medium as recited in claim 16, wherein the one or more of the nodes correspond to computing devices associated with clients of the RPA system, and wherein each of the one or more nodes is a computing device.

18. A tangible storage medium as recited in claim 16, wherein the method comprises:

computer-executable instructions for receiving a selection of an identifier for a selected node of the determined one or more of the nodes;

computer-executable instructions for requesting download of the particular bot-related file from the selected node to the first computing device; and computer-executable instructions for receiving the particular bot-related file from the selected node.

19. A tangible storage medium as recited in claim 18, wherein the method comprises:

computer-executable instructions for transmitting an update to the RPA server that the particular bot-related file has been downloaded to the first computing device.

20. A tangible storage medium as recited in claim 18, wherein the method comprises:

computer-executable instructions for, prior to requesting download of the particular bot-related file from either the RPA server or the selected node, checking for presence of the particular bot-related file in a cache maintained by the first computing device.

* * * * *